Sept. 17, 1963 J. J. BALLANCE 3,104,273
APPARATUS FOR PROJECTING SELECTIVE ANIMATED IMAGES
Filed July 28, 1959 2 Sheets-Sheet 1
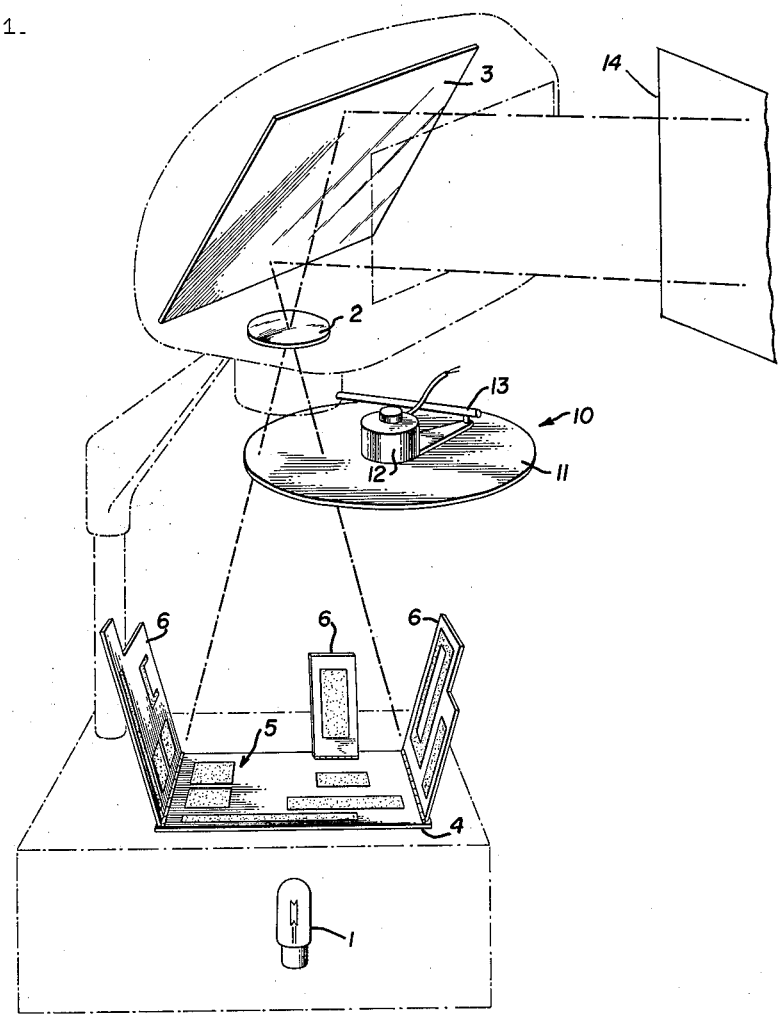
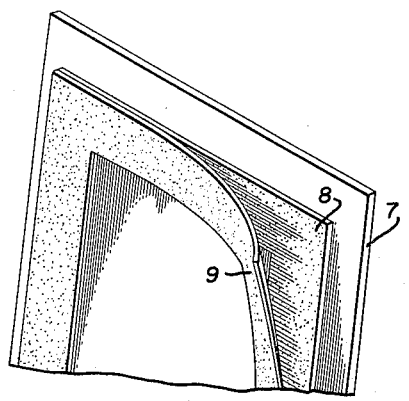
INVENTOR.
JOHN J. BALLANCE, DECEASED
BY MARY G. BALLANCE, ADMINISTRATRIX
BY
*Charles J. Elderkin*
ATTORNEY Sept. 17, 1963    J. J. BALLANCE    3,104,273
APPARATUS FOR PROJECTING SELECTIVE ANIMATED IMAGES
Filed July 28, 1959    2 Sheets-Sheet 2
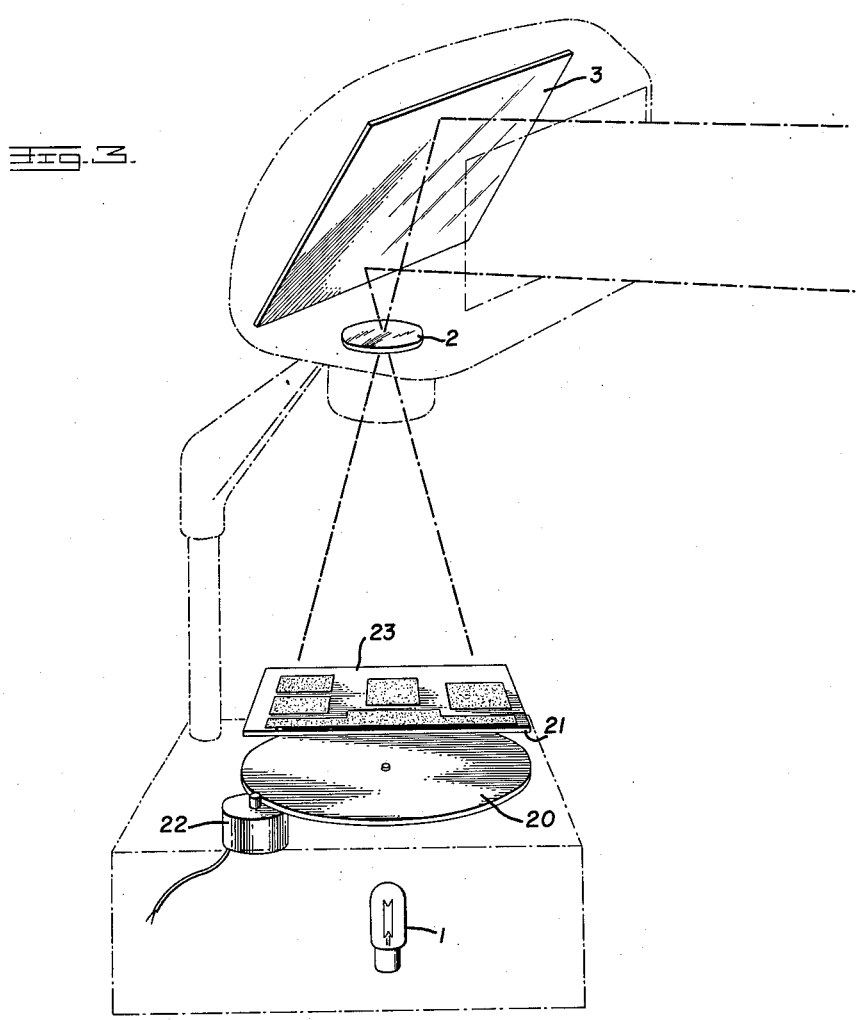
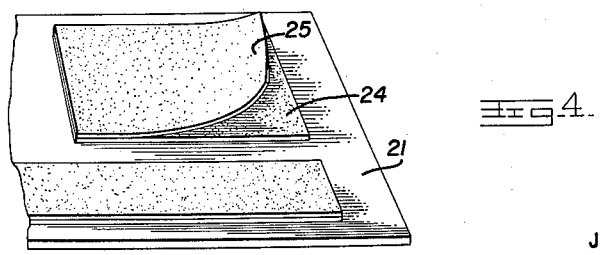
INVENTOR.
JOHN J. BALLANCE, DECEASED
BY MARY G. BALLANCE, ADMINISTRATRIX
BY Charles J. Elderkin
ATTORNEY 3,104,273
APPARATUS FOR PROJECTING SELECTIVE
ANIMATED IMAGES
John J. Ballance, deceased, late of Port Washington, N.Y., by Mary G. Ballance, administratrix, Port Washington, N.Y., assignor to Technical Animations, Inc., Port Washington, N.Y., a corporation of New York
Filed July 28, 1959, Ser. No. 830,054
1 Claim. (Cl. 88—65)

This invention relates to the field of optical projection and more particularly to an improved apparatus for projecting selectively animated images.

In many fields, it is common to employ visual displays in connection with explanation or demonstration of machines, electrical systems, principles of physics, chemistry and mathematics, medical and surgical procedures, and so forth. For such purposes, prior art workers have employed working models, animated panel trainers, mechanically animated transparencies, cartoon type motion pictures, sequentially projected static transparencies and the like. While satisfactory for some purposes, all of such prior-art visual display means have definite disadvantages.

Working models frequently do not permit an unobstructed view of all parts of the model and their operational relationship, are used only with difficulty in illustrating such phenomena as combustion, electrical current flow and fluid flow, and are difficult to demonstrate to a large group of observers. Animated panel trainers can be used to demonstrate certain types of systems and the operational relationship of parts in certain types of devices, but are bulky, difficult to move and often dependent upon special power supplies. Mechanically animated transparencies can be employed successfully for demonstrating various devices and systems but cannot be used to illustrate flow, movement of fluids, combustion or the action of electrons, for example. Motion pictures of various types are capable of satisfactory operation for most purposes, but are unduly expensive and offer little flexibility in use. Sequentially projected static transparencies are suitable for illustrating relatively simple subjects but cannot be employed to illustrate flow, movement of parts and, in many cases, the operational relationship of parts of a device.

An object of the present invention is to devise a relatively simple and inexpensive apparatus for displaying animated transparencies by optical projection in such fashion that all of the disadvantages just referred to are obviated.

Another object is to provide such an apparatus wherein a selected portion of the total image displayed can be animated while the remainder of the image remains static.

A further object is to accomplish animation of a projected transparency by employing rotatory polarization.

A still further object is to provide an apparatus for animated display combining motion simulation achieved by means of rotatory polarization with that provided by mechanical animation of the transparency.

Another object is to achieve animation by means of overlays applied to an otherwise static transparency, whereby the projected image of the system or component being displayed in motion can be built up progressively.

Yet another object is to provide animation equipment of the type described which can be applied in simple fashion to a conventional projector.

In order that the manner in which these and other objects are attained in accordance with the invention can be understood in detail, reference is had to the accompanying drawings, which form a part of this specification, and wherein:

FIG. 1 is a perspective view illustrating semi-diagrammatically one form of the animation apparatus of the invention applied to a conventional overhead projector in order to carry out the present method;

FIG. 2 is a fragmentary perspective view, enlarged in scale, of a portion of an overlay employed in the apparatus of FIG. 1;

FIG. 3 is a semi-diagrammatic view, similar to FIG. 1, showing a second embodiment of the invention, and FIG. 4 is a fragmentary perspective view, enlarged in scale, of a portion of an overlay employed in the apparatus of FIG. 1.

In general, the method of the present invention is carried out by employing a conventionally formed transparency representing the subject matter to be displayed, and causing the projected light, which passes through the transparency, to pass successively through a first polarizing element, at least one birefringent element selectively positioned with respect to the image of the transparency, and a second polarizing element while rotating either or both polarizing elements so that the optical axis of the first, which may be considered as the polarizer, is made to vary with respect to that of the second, which may be considered as the analyzer. Each birefringent element is introduced into the projection system so as to be aligned, in the direction of travel of the projection light, with a given portion of the image on the transparency and as will be apparent from the following explanation, introduction of each birefringent element into the projection system will cause apparent movement of that portion of the projected image derived from the portion of the transparency with which the birefringent element is aligned.

Operability of the method and apparatus of the invention can be explained in part by the generally accepted theory regarding the effect of birefringent materials on polarized light. When a thin birefringent crystal or a thin sheet of birefringent resinous material is placed between two sheets of light polarizing material, an image projected through all three elements will be of a definite color. This occurs because, when a beam of light falls on a birefringent element, the beam is in general broken up into two plane-polarized beams with their vibration planes at right angles to each other. These two beams traverse the birefringent element at different rates, so that a phase difference between the two beams is introduced. The value of this phase difference, for any given wave length of light, depends upon the difference in velocity between the two beams and the length of the path through the birefringent material.

In accordance with the invention, the light supplied to the birefringent element is plane-polarized by the first polarizing element and, on entering the birefringent material, is broken into two components polarized at right angles to each other. On emerging from the birefringent element and entering the second polarizing element, these two components are again combined into one plane-polarized beam. However, a phase difference has been introduced between the two components, which phase difference depends upon the nature and thickness of the birefringent material interposed between the two light polarizing elements. In accordance with the invention, this phase difference is "programmed," by selective choice of the birefringent material and use of a plurality of birefringent elements introduced in sequence to the optical system, in order to obtain apparent movement in the projected image.

Referring now to the drawings in detail, and first to FIGS. 1 and 2 thereof, it will be seen that this embodiment of the invention employs a standard overhead projector indicated in broken lines and comprising a light source 1, a projection lens 2 and a projector mirror 3, light travelling horizontally or otherwise from the mirror to a screen, 14.

As is common in such devices, a static transparency 4, presenting the image to be projected for display, is supported in any suitable manner between the light source and the lens. Here, a complex image is indicated at 5.

Arranged for selective insertion into the optical system of the projector are a plurality of multi-layer overlays 6 each comprising a transparent carrier sheet 7, a thin sheet of birefringent material 8 and a thin sheet of light polarizing material 9, as seen in FIG. 2. Each overlay 6 is movably supported in such fashion that the overlay can be manually or otherwise shifted into registry with a given portion of image 5 so that, when the overlay is so shifted, light from source 1 then passes first through transparency 4, then through light polarizing sheet 9 and birefringent sheet 8, in that order, in the particular area covered by the overlay.

Suitably mounted above the transparency and overlays is an analyzer indicated generally at 10 and comprising a circular light polarizing disc 11 rotatably driven by an electric motor 12 carried by a bracket 13 which may be attached to the lens tube or any other convenient part of the projector. The light analyzer is so positioned that polarizing disc 11 lies transversely of the light path from source to lens and the axis of rotation of the disc extends parallel to that path. The electric drive motor, and its gearing when employed, is arranged to rotate polarizing disc 11 at a predetermined substantially constant speed.

When overlays 6 are in inactive position, as seen in FIG. 1, the projected image is static, even though the analyzer 10 is in operation, since none of the birefringent elements 8 has been introduced into the light path of the projector. However, as each overlay is dropped into place, it brings a light polarizing element 9 and a birefringent element 8 into registry with a selected portion of image 5, and movement of this image portion results and continues so long as (1) the overlay is in place and (2) rotation of polarized disc 11 continues.

It will be understood that each overlay 6 is arranged to register with its own particular portion of the image. Accordingly, in actual practice, the image may first be displayed with all overlays in inactive position, to give a static image, a first one of the overlays is then dropped into place to animate a first portion of the image, a second dropped into place to animate a second image portion, and so forth. If it is necessary to have two overlays include the same image portion, then the one of such overlays which is first inserted is removed before insertion of the second overlay into the optical system.

The type of motion occurring in the projected image as a result of insertion of birefringent material 8 and rotation of disc 11 depends upon the specific nature of the birefringent material. Thus, rectilinear motion can be obtained by use of one given birefringent material, rotary motion by use of another, and so forth. By introducing a birefringent material capable of half wave warpage, the movement obtained in the projected image can be reversed.

As illustrated in FIG. 1, one convenient manner of mounting overlays 6 is to hinge the same either directly to transparency 4, or to the support therefor, at points outside of the image area. Thus, the overlays can include carrier sheets 7 which are very thin and flexible, one edge portion of the carrier sheet being cemented to the transparency 4 and the desired hinge action being afforded by the flexibility of carrier sheet 7. By such means, proper registration of the overlay with the transparency is assured, it being necessary only to allow the overlay to assume its natural flat condition on the transparency. In order to obtain optimum strength and clarity of the projected image, it is desirable to make the overlays 6 as thin as possible and to employ therefor materials of maximum transparency. Lamination of elements 7, 8 and 9 of overlays 6 can be accomplished in any suitable manner. Thus, for example, the sheets or films of polarizing and birefringent materials can be provided with a coating of transparent pressure sensitive adhesive on their appropriate faces.

In the embodiment of the invention illustrated in FIGS. 3 and 4, the same standard overhead projector described with reference to FIG. 1 is employed. Here, however, a rotating light polarizing disc 20 is located between the light source 1 and the transparency 21. Disc 20 is mounted in any suitable fashion to rotate about a vertical axis and is rotated by a motor driven friction wheel 22 engaging the periphery of disc 20.

The transparency 21 provides the usual static image and, in addition, has adhered to its upper face one or more animation-producing overlays 23. As seen in FIG. 4, overlay 23 consists of a thin sheet of birefringent material 24 adhered directly to the transparency 21 and a thin sheet of light polarizing material 25 adhered directly to the upper face of birefringent sheet 24.

So long as the combination of transparency 21 and overlay 23 is in place and polarizing disc 20 is rotating, projection will provide on the screen a display image in which those portions covered by overlay 23 are animated, the principle of operation being the same as described with reference to FIGS. 1 and 2.

Advantageously, the present invention is carried out by using the novel laminated birefringent assemblies described and claimed in copending application Serial Number 830,055, now abandoned, filed concurrently herewith, in the names of the present inventor and Stanley L. Schwartz. In such assemblies, there is provided a birefringent layer made up of a plurality of thin pieces of molecularly oriented synthetic resin material, there being an angular difference in molecular orientation between adjacent ones of such pieces, the resulting motion pattern depending upon the extent of such difference and upon the size of the pieces.

It is apparent that, so long as the image or a portion thereof is projected via a polarizer, a birefringent element and an analyzer, in that order, with either or both the polarizer and the analyzer rotated, the desired animation will be attained. While the rotating light polarizing element can be considerably spaced from the transparency, the combination of the birefringent element and the remaining polarizing element are maintained in contact with the transparency. The specific arrangement employed depends upon the purposes to be served. Thus, the arrangement of FIGS. 1 and 2 allows different portions of the image to be placed in motion successively and independently, by manual manipulation of overlays 6. The arrangement of FIGS. 3 and 4, on the other hand, provides animation of predetermined portions of the image but without capability of easily changing the portions of the image being animated. While the invention has been described with reference to an overhead projector, it is to be understood that it is equally applicable for use with any type of projector capable of projecting transparencies. Thus, any of the usual 35 mm. projectors, horizontal projectors, etc., can be employed.

While the combination of motor 12 and rotating polarizing disc 11 has been shown as mounted on the projector in FIG. 1, it will be understood that the motor and polarizing disc can be mounted on a suitable handle, forming a portable unit, so as to be freely manipulatable at the will of the operator. Obviously, numerous other variations and changes are possible without departing from the scope of the invention as defined in the appended claim.

What is claimed is:

A display system capable of animating an optically projected image from a normally static transparency comprising:

an optical projection system having a light source, lens means and a viewing screen;

a light polarizing element interposed in said projection system along the light path and mounted for rotation about an axis extending in the direction of the light path;

drive means for rotating said polarizing element; a normally static transparency having an image thereon interposed in said projection system along the light path; and a plurality of overlays which when in their operative position cover only the portion of said image desired to be animated and which comprises a polarizing layer and a birefringent layer, said birefringent layer being disposed between said polarizing element and said polarizing layer and comprising a plurality of pieces of molecularly oriented synthetic resin material, there being an angular difference in molecular orientation between adjacent ones of said pieces, each of said overlays being adjustably supported for movement from an inactive position out of said light path to an operative position adjacent said transparency in which overlay is registered with a particular portion of the image on said transparency, said overlays creating visual effects each distinct from the other, the remainder of said image desired to be illuminated but not covered by said overlay transmitting light isotropically.

References Cited in the file of this patent

UNITED STATES PATENTS

| | | |
|---|---|---|
| 1,885,642 | Strong | Nov. 1, 1932 |
| 2,070,787 | Frocht | Feb. 16, 1937 |
| 2,146,962 | Land | Feb. 14, 1939 |
| 2,158,129 | Land | May 16, 1939 |
| 2,169,022 | Chubb | Aug. 8, 1939 |
| 2,393,968 | Burchell et al. | Feb. 5, 1946 |
| 2,838,864 | Guida | June 17, 1958 |